United States Patent [19]

Spanjersberg

[11] 3,846,753

[45] Nov. 5, 1974

[54] AUTOMATIC ADDRESS DETECTION SYSTEM

[75] Inventor: Arie Adriaan Spanjersberg, Leiderdorp, Netherlands

[73] Assignee: De Staat Der Nederlanden, Ten Deze Vertegenwoordigd Door De Directeur-Generaal Der Posterijen, Telegrafie, Hague, Netherlands

[22] Filed: Sept. 20, 1972

[21] Appl. No.: 290,717

[30] Foreign Application Priority Data

Sept. 23, 1971 Netherlands .......................... 7113082

[52] U.S. Cl. .................... 340/146.3 D, 340/146.3 H

[51] Int. Cl. .............................................. G06k 9/16

[58] Field of Search .............................. 340/146.3 D

[56] References Cited

UNITED STATES PATENTS 3,503,043 3/1970 Brass ............................ 340/146.3 D 3,543,238 11/1970 Schade ............................ 340/146.3 D 3,553,646 1/1971 Hardin ............................ 340/146.3 D

*Primary Examiner*—Gareth D. Shaw

*Assistant Examiner*—Robert F. Gnuse

[57] ABSTRACT

An arrangement for the automatic detection of an address, for example an address on a letter. The letter is advanced by means of a transport device past a scanning circuit, for example a television camera, for a first, coarse-raster scanning operation wherein the address code is located on the letter, and then past a second scanning circuit, for exaple an image dissector tube, for a second, fine-raster scanning operation wherein the code is recognized. The scanning circuits comprise scanning means for converting the information into a pulsed signal, and a processor processing the signals of the first scanning operation in order to locate the address code and controlling the scanning means for scanning the individual characters of the code.

9 Claims, 7 Drawing Figures

AUTOMATIC ADDRESS DETECTION SYSTEM

An automatic address detection arrangement for the automatic location and subsequent recognition of an address code on documents, which arrangement comprises a scanning circuit arrangement by means of which in a first coarse-raster scanning operation the information on the address side of the document is scanned and the address code is located among this information, and in a second fine-raster scanning operation the address code is scanned, the scanning circuit arrangement comprising scanning means for converting the information into a pulsed signal, a processor for locating the address code by means of this signal and for controlling the scanning means so as to permit scanning of the individual characters of the code in the proper location and for temporarily storing the resultant information in a section of the processor memory, and a document leading edge detector for producing a scan start signal.

BACKGROUND OF THE INVENTION

Such an arrangement is known from an article by Von Rolf Jurk entitled "Postleitzahlen — automatisch gelesen" in Informationen Forderund Verteiltechnik 1965, pages 51–54.

This article discloses a reading arrangement for automatically reading a numerical postal code on postal items. The structure of this arrangement entails, however, that the postal item to be scanned has to be stationary from the beginning of the coarse scan to the end of the fine scan. This is due to the fact that one and the same circuit is employed both for the coarse and the fine scan and that scanning is performed by the cooperation of a cathode ray tube producing a scanning beam and a separately disposed photoelectric cell for converting the scanning light spot sweeping the postal item into a digital black-and-white signal.

In order to increase the processing capacity, two mechanical transport paths each having its own scanning station and photocell are employed, which should operate in synchronism.

From a mechanical point of view this requires a complicated arrangement.

In "Postal Automation Newsletter", Vol. 1, No. 1, April 1971, a reading arrangement is described for automatically reading addresses on postal items. This publication concerns an elaborate processing system, in which a total number of four lines of the address is scanned in a read station and the resultant information is temporarily stored in a video storage unit. The reading arrangement comprises a vertical column of photosensitive cells.

By means of a searching device, first the location of the address lines to be scanned is determined. Since the address may be found at any place within the reading zone, the reading arrangement should comprise a great number of photosensitive cells in order to attain adequate optical resolution throughout the entire reading zone.

SUMMARY OF THE INVENTION

It is an object of the invention to provide an arrangement in which the above drawbacks are not present but which still permits rapid and reliable operation and, moreover, which is compact.

According to the invention this object is achieved by the fact that a transport device is provided for continuously advancing the document past the scanning means in a direction such that: the address code is at the head of the address line, that the scanning circuit arrangement comprises a first scanning circuit for coarse scanning and a separate second scanning circuit for fine scanning, each circuit having a different scanning means. The scanning means of the first scanning circuit is a television camera tube, such as a plumbicon, and the scanning means of the second scanning circuit is an image dissector tube disposed adjacent to the path of travel of the document downstream of the television camera tube at a distance from this tube depending upon the speed of the continuous advancement of the document and upon the time required by the processor for locating the address code.

By using two scanning circuits instead of a single circuit for coarse and fine scanning, which two circuits comprise a television camera tube (such as a plumbicon) and an image dissector tube, respectively, and by further disposing the image dissector tube downstream of the television camera in the path of travel of the postal items in order to compensate the required calculating time in the processor, it is no longer necessary to hold the postal item stationary during and inbetween the scans. In this way time is saved without it being necessary to double the transport path.

Moreover, owing to the address scanning method used, the amount of information to be temporarily stored in a memory is comparatively small in contrast to the arrangement known from the last-mentioned article. Although the principles underlying the operation of the arrangement according to the invention apply to any size of document and to any size of the address and the address code, it will be clear that in order to obtain the simplest possible arrangement, any adjusting devices required for the adjustment to highly different document for mats, type styles and sizes used, interline spaces, and the like should be avoided as much as possible. Like this is done in the arrangement known from the first-mentioned article by Von Rolf Jurk, it is therefore preferred to set definite requirements to the size of the documents to be sorted and to the form of the address block. Since the invention particularly relates to a rapid sorting of postal items, there are no serious objections thereto. These requirements for the postal items can be derived from statistical data obtained in actual practice, while it can be conveniently accepted that postal items which do not meet these standards cannot be readily sorted by the machine.

The embodiment of the invention to be described hereinafter, which is adapted for sorting postal items by the automatic location and subsequent recognition of the address code, is based on a nine-digit address code comprising a delivery code of five digits and a despatch code of four digits, which satisfies the present need. By the term "delivery code" the private address is understood, and by the term "despatch code" the name of the municipality is understood. The two codes may be placed either on two separate lines or on the same line. Each code should be preceded by at least two spaces so that the code is clearly separated from the written words of the private address and the name of the written words of the municipality in letters. When the two codes are placed on the same line, a distance of at least two spaces should be observed between the written words of the delivery code and the name of the municipality. The entire address on the postal item will usually comprise two or three lines, but it may of course comprise four lines or more, which may be randomly dispersed over the address side of the postal item.

The embodiment of the invention to be described is further based on the assumption that the postal items to be processed have a minimum length of 40 mms and a maximum length of 235 mms, while the height may vary between a minimum of 90 mms and a maximum of 135 mms.

Splitting up the address code into a delivery code and a despatch code permits a first sorting of postal items according to the municipality and a subsequent sorting according to the private address for each municipality. This is based on practical considerations and, as such, does not constitute a condition for the invention. If desired, sorting could be extended by a third code for countries or other desired purposes.

In scanning postal items, it is not a simple operation to automatically locate the address code, also because the parts of the address code, such as the delivery code and the despatch code, may occupy random relative positions on the address side of the postal item.

Since the code recognition requires only the digits of the code to be fine-raster scanned, it is not efficient to scan the entire address side in accordance with a finely divided raster. It is known from the above article by Von Rolf Jurk to have the code recognition preceded by a code location. This location may be carried out by comparatively coarse-raster scanning. Once the code has been located, only a small portion of the address side of the postal item has to be fine-raster scanned starting from this location.

BRIEF DESCRIPTION OF THE VIEWS

The invention will be elucidated hereinafter with reference to the drawing, in which FIG. 1 shows a postal item having an address code in the position in which the arrangement according to the invention is capable of detecting and scanning the code;

Figure 6:
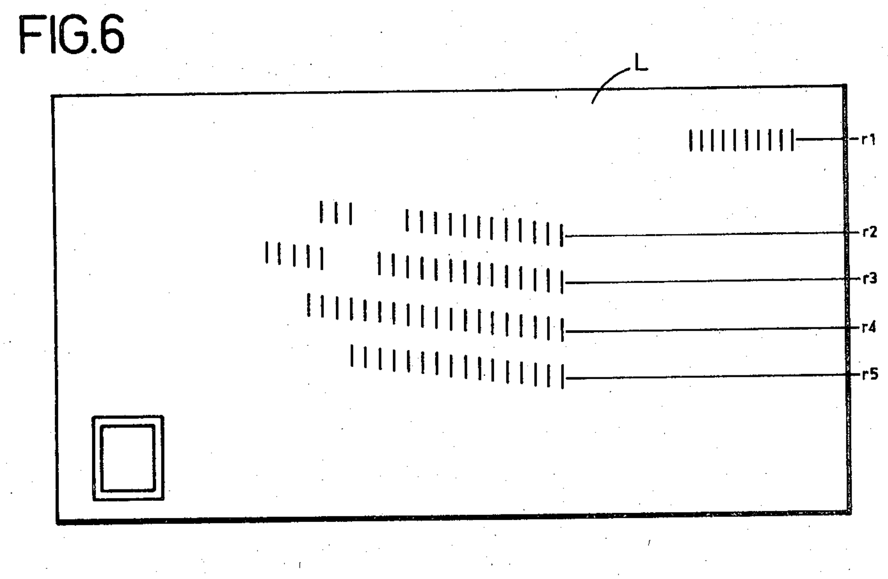
FIG. 6 is a face view of a postal item in the scanning position.
Figure 7:
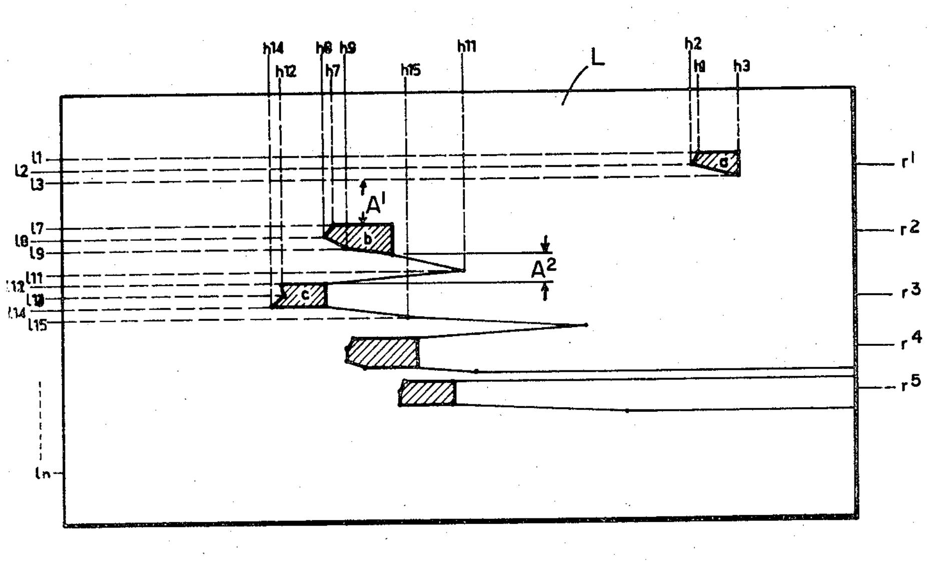
Figure 5:
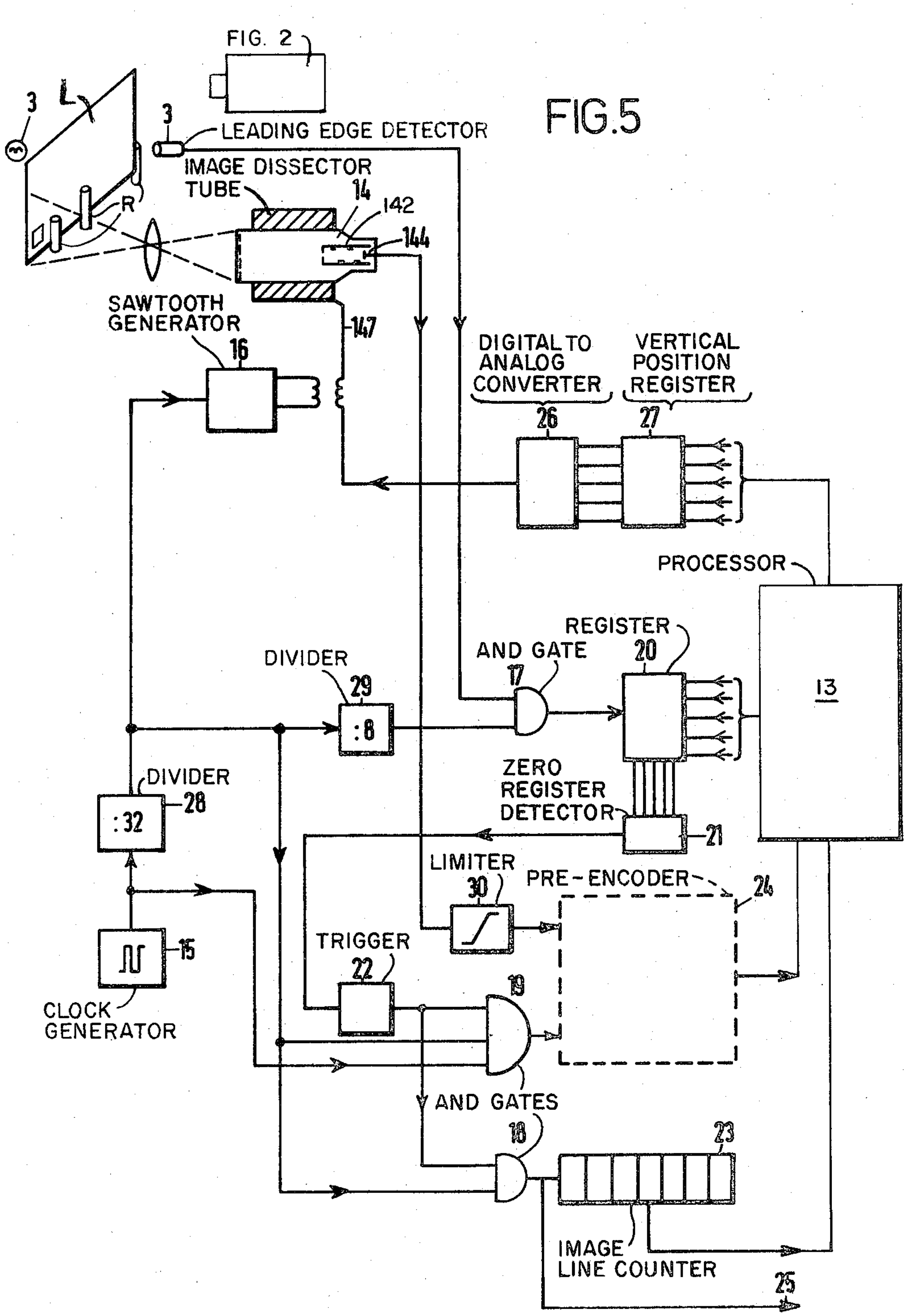

FIG. 7 schematically shows the points with their associated coordinates found after coarse-raster scanning of the postal item shown in FIG. 6.

DETAILED DESCRIPTION OF A PREFERRED EMBODIMENT

As stated above, two main phases can be distinguished in the automatic address detection, viz. the location of the address code and the scanning of the individual characters of the address code.

I. Address Code Locator Circuit

The location of the address code will be described with reference to FIGS. 1 and 2.

Figure 1:
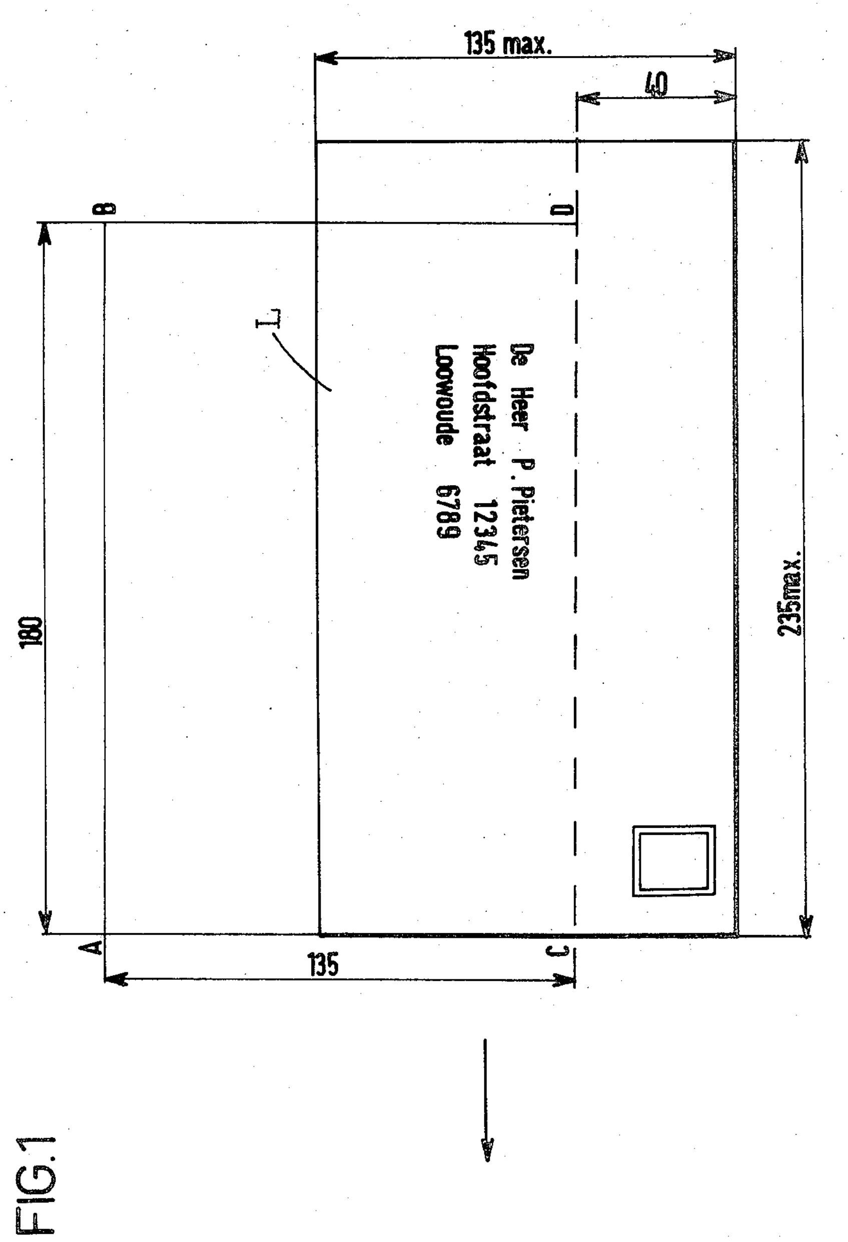

The postal items L are transported with uniform speed through the machine in the upside-down or inverted position shown (see FIG. 1). The direction of transport is indicated by an arrow. The portion of the postal item L beneath the broken line is not used for the code location and recognition so that at this place transport rollers R can be arranged. The address code part of the address area is scanned by means of a television camera 1, for example, a rectangular area ABCD ($180 \times 135$ mms$^2$).

As soon as the leading edge of the postal item coincides with the line AC a light flash of a duration of about 10 $\mu$sec is produced. The letter L can be advanced with uniform speed, while at the termination of the light flash 4 the horizontal line scan of an image produced on a camera tube (such as a plumbicon) can start. In FIG. 1 the scanning direction is from left to right and from top to bottom. The time period of this scan may be 20 msec. This method can be applied by utilizing the inertia of the television camera tube 1. In this phase coarse-raster scanning is used. If one frame of the television image is used, about 280 image lines are available. Every other image line is effectively utilized, so that 140 lines are available. In the described embodiment 128 image lines will be used. In the case of the dimensions give above this implies a scanning density on the address area of about one image per mm, which is sufficient for the location of the address code.

In principle the location in the vertical direction can be performed by counting the number of "white" image lines up to the appearance of image lines including pulses.

For the location in the horizontal direction a clock generator 2 is employed.

Figures 2, 5:
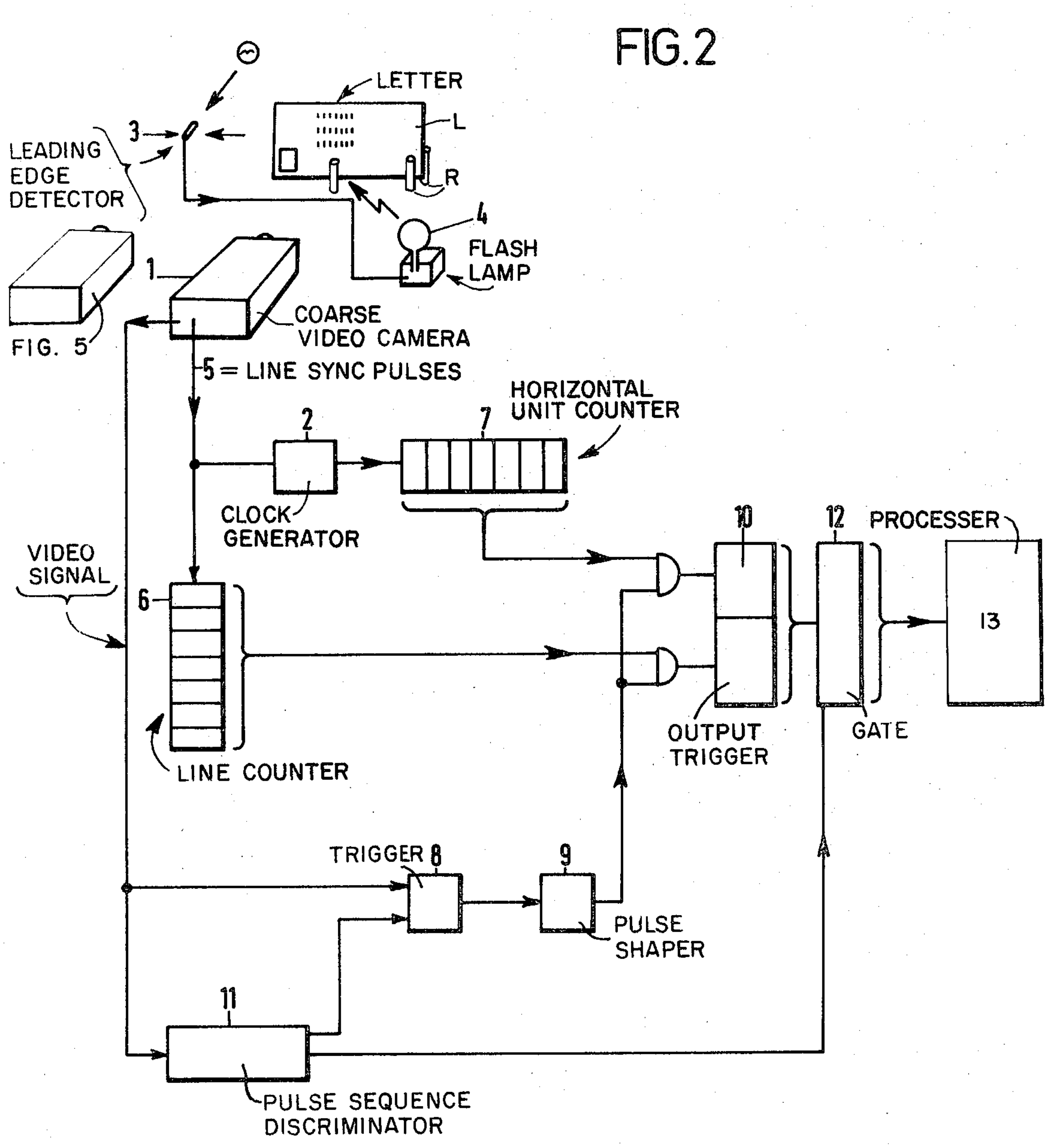
FIG. 2 is a schematic block wiring diagram of the circuit locating the address code by coarse-raster scanning.
FIG. 5 is a schematic block wiring diagram of the circuit by means of which the fine-raster scanning of the detected address code is performed.

FIG. 2 illustrates the principle of the device by which the location data can be transmitted to the processor.

A "Leading edge detector" 3 comprising a lamp and a photo-cell provides a signal indicating when a postal item L is in the desired scanning position. This signal fires a flashlight lamp 4. During the subsequent 20 msec the television camera 1 produces a signal corresponding to the optical information on the letter.

The line synchronisation pulses 5 control a line counter 6. The position of this counter always corresponds to the number of scanned image lines.

Moreover, at the beginning of each image line the clock generator 2 is actuated. This generator produces 128 pulses per image line. These pulses are counted by the "horizontal unit counter" 7.

The video signal is applied through a trigger 8 to a pulse shaper 9. When characters or digits on the letter are scanned, pulses are produced in the video signal.

At the appearance of a pulse in the video signal the trigger 8 is switched and the pulse shaper 9 produces a pulse by means of which the positions of the line counter 6 and of the horizontal unit counter 7 are transferred to the output register 10. Only when a sequence of pulses is produced, is the information significant. This sequence of pulses is assessed by the pulse sequence discriminator 11. This procedure will be described hereinafter. When a pulse sequence is detected, the information contained in the output register 10 is transferred to the processor 13. If after the switching of the trigger 8 no pulse sequence appears, the trigger 8 is reset by the pulse sequence discriminator. After the termination of the scan the address code is located by means of a program in the processor 13 (see the examples of programs in the following diagrams).

By means of the program, two data are successively ascertained:

*a*. The number of associated lines on the postal item. The presence of an address line is ascertained when a pulse sequence is found on at least two consecutive image lines. In the case of two associated address lines (including one bearing the name of the address) it may be assumed that the address has been made by the line printer of a large customer so that the prescribed standard address disposition has been respected. Alternatively the address may comprise more than two lines. An example of a two-line address is:

De heer P. Pieterson
Hoofdstraat 12345 Loowoude 6789

An example of a three-line address is:

De heer P. Pieterson
Hoofdstraat 12345
Loowoude 6789

*b*. The position of the centre of the address line bearing the despatch code. If the address comprises more than two lines, that is to say, if the despatch code and the delivery code are not on the same line, the position of the centre of the delivery code line is also determined.

By the term "centre of the line" should be understood the beginning of an imaginary line passing substantially through the horizontal centres of the series of characters and digits located on the same lines in the longitudinal direction of this line. When the postal item occupies the scanning position shown in FIG. 1, that is to say, when it is in the upside-down position, the centres of the line of the despatch code and of the delivery code are located at the centre of the last digit of the respective code.

In the scanning raster the position of said centre is represented in orthogonal fashion, that is to say by a value $l$ and a value $h$, $l$ being the horizontal image line bearing the centre of the line and $h$ being the distance of the centre on the image line from the edge of the scanning zone. The value $h$ may therefore be considered to be the horizontal coordinate associated with a given image line (see FIG. 7).

The results of the location procedure are available in the processor in the form of two numbers. For the sake of simplicity, these values are called the coordinates of the points determinative of the field to be scanned in the recognition procedure.

In a detailed example, it will be described hereinafter in which manner the location is calculated by the processor 13.

Figure 3:
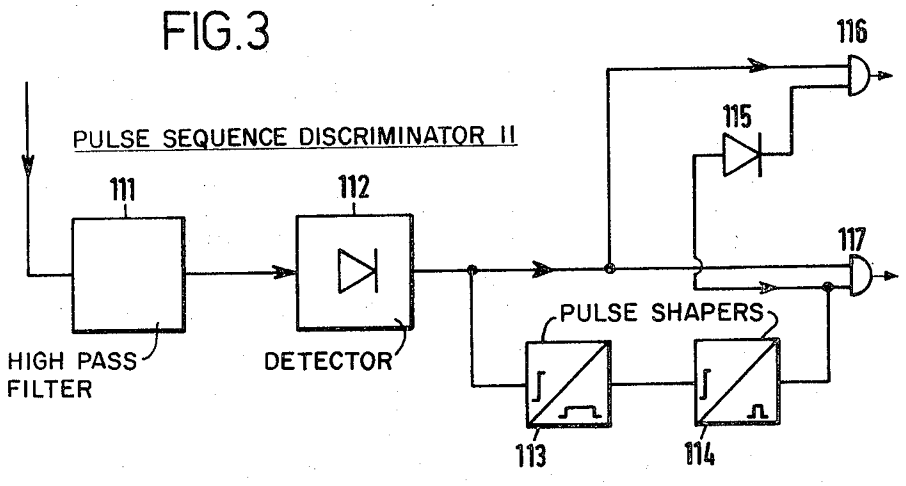
FIG. 3 is a schematic block wiring diagram of a pulse sequence discriminator circuit.

The pulse sequence discriminator 11, which serves for ascertaining whether an address code line has been detected, is shown in FIG. 3. The discriminator comprises a high-pass filter 111, a detector circuit 112, two pulse-shapers 113, 114, an inversion amplifier 115 and two AND-gates.

Arriving at the input of the high-pass filter 111, the amplitude variations of the video signal having sufficiently high frequency produce an AC-voltage at the output of this filter 111. This AC voltage is applied to the detector circuit 112, which produces a DC-voltage when an AC-voltage is applied to its input. Such detector circuits 112 are known also in telecommunication techniques. As soon as a DC-voltage pulse is produced at the output of the detector 112, the pulse shaper 113 is excited to produce a pulse of a duration equal to the time required for a one-line scan of, for example, three characters on the postal item. At the trailing edge of the pulse the pulse, shaper 114 is excited to produce a short pulse at its output. The output of the pulse shaper 114 is connected via the inversion amplifier 115 to the AND-gate 116. If during the pulse at the output of the pulse shaper 114 no DC-voltage is present any longer at the output of the detector circuit 112, a pulse is produced at the output of the AND-gate 116 by which the trigger 8 (FIG. 2) is reset. However, if an output signal is present at the output of the detector circuit 112, a pulse is produced at the output of the AND-gate 117. This pulse releases the gate 12 (FIG. 2) and the information is transferred from the output register 10 to the processor 13.

Once the address code has been located and the required relevant information has been stored in the processor memory 13, the second scanning process for code recognition can start. As will be explained hereinafter, the fine-raster scanning is performed after the "centre" of the line bearing, the respective code (such as the despatch code or the delivery code) is aligned with the aperture of the multiplier tube 142 (see FIGS. 4 and 5).

II. Address Code Reader Circuit

Figure 4:
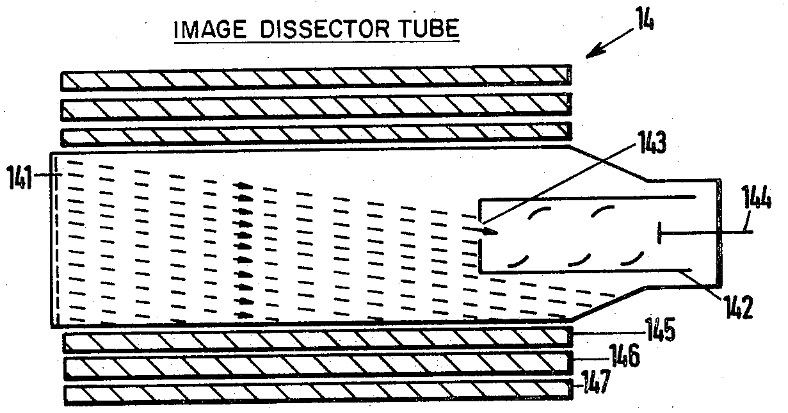
FIG. 4 is a schematic sectional view of an image dissector tube.

The address code is scanned by using a so-called image dissector tube 14. A more detailed description of this tube can be found on page 230 of the book "Television" by V. K. Zworijkin and G. A. Morton published by Wiley, Chapman and Hall, New York (1945). FIG. 4 illustrates the principle of this tube.

An optical image is projected onto the photo-cathode 141. Under the action of the electric field the electrons will travel in parallel paths away from the cathode towards the multiplier tube 142. The latter has a small aperture 143. The electrons passing through the aperture arrive at the end anode 144 after having traversed a plurality of dynodes producing amplification by secondary emission. By external coils 145, 146, 147 the electron beam can be focused, deflected in the horizontal direction, and deflected in the vertical direction, respectively. In this way all image points of the image projected onto the cathode 141 can be successively projected onto the aperture 143 of the multiplier tube 142.

Properties of this tube are: very high optical resolution up to 200 image lines per centimetre; slight inertia; and no thermal cathode.

Owing to these properties, the image dissector tube 14 can be employed for scanning moving documents.

The tube 14 can be mounted adjacent to the transport path of the postal items (see FIGS. 2 and 5). The postal items move with a substantially uniform speed in horizontal direction, so that the image moves with a corresponding speed across the cathode of the image dissector tube 14. When a deflection current is passed through the vertical deflection coil 146, the video signal is produced at the output of the image dissector tube 14.

The deflection current traversing the vertical deflection coil 146 consists of a direct-current component and a sawtooth current superimposed thereon. By means of the direct-current component the centre of the address line on the postal item to be scanned is aligned with the aperture of the multiplier tube 142.

The sawtooth component of the deflection current provides a linear scan.

A condition is that the height of the portion of the letter to be scanned should not exceed the useful diameter of the photosensitive cathode.

As stated above, the allowable height of the postal item L is, for example, maximally 135 mms. It is assumed that an upper strip of 40 mms is not used and that also the bottom a strip of 10 mms does not bear address information. Consequently, a strip of maximally 85 mms in the vertical direction has to be covered.

The scan of an address line is performed in a strip, the width of which exceeds the height of the characters to be scanned and which extends above and beneath the characters. If the height of the characters is 2 mms (the most frequently occuring height), the scan of the address code to be recognized is performed in a strip of width of, for example, 4 mms.

In order to obtain sufficient detailed information for the recognition of the digits of the address code, the 4 mm strip is subdivided in vertical direction into 32 image elements. This means that the required optical resolution amounts to eight lines/mm.

If an image dissector tube 14 having a cathode diameter of 76 mms is used, the required resolution on the cathode surface is: 85/76 · 8 lines/mm ≈ 9 lines/mm. This can be readily achieved, since a resolution of 20 lines/mm is possible.

If it is desired to scan also in horizontal direction with a line density of 8 lines/mm based on the letter surface, while the assumed rate of transport is 2.3 m/sec, the line frequency must be: 18,400 Hz (18.4 kHz). The duration of one cycle is then 54 μsec.

For the quantisation in the vertical direction a clock generator 15 is employed (see FIG. 5).

Consequently, the procedure is as follows: prior to the start of the scanning, the direct-current component of the vertical deflection curren in coil 147 is set to a value corresponding to the value obtained by the preceding locating procedure. The direct-current component is formed by means of a digital-to-analog converter 26, the input value of which originates from the vertical-position register 27.

When the direct-current component has been set, scanning is performed at the desired height of the line.

Prior to the start of the scanning also the horizontal location of the address code is stored in the register 20 intended for this purpose.

After each scanning of a vertical image line the resultant information is transferred to the processor 13.

The clock generator 15 has a repetition frequency of 1.17 MHz, which means that 32 pulses are produced in a time period of 27 μsec. The clock pulses are applied to a 32-divider 28, which will produce pulses at a repetition frequency of 18.4 kHz (duration of one cycle 54 μsec.) The sawtooth wave generator 16 for the vertical deflection is controlled by these pulses. The deflection current is such that the forward sweep has the same duration as the retrace (27 μsec.). Scanning is performed during the forward sweep whereas during the retrace the resultant information is transferred to the processor 13 from anode 144.

As soon as the address side is positioned in front of the scanning aperture 143 of the image dissector tube 14, the leading edge detector 3 releases the gate 17. Pulses from an eight-divider 29 are applied to the other input of the gate 17 at a frequency equal to 1/8th of the line frequency. Since the scanning density amounts to eight lines/mm, a pulse will appear at an input of the gate 17 each time a postal item has advanced a distance of 1 mm. The output of gate 17 is connected to the register 20, in which the horizontal location of the address code is stored. This register has the form of a counter. Prior to the start of the scanning, the inverse value of the horizontal location is written into the register 20. The numerical value corresponds to the distance in millimeters between the starting point of the scanning of the address code and the edge of the letter L. At least two spaces preceding the code are taken into account. When the scanning can start, the horizontal location register 20 is in the zero-position. This can be detected by the zero-position detector 21. At this instant the trigger 22 is switched. As a result thereof the gate 18 is released. The image-line counter 23 records the ordinal number of the image line that is scanned. The video information limited in an amplitude limiter 30 reaches the so-called pre-encoder 24. The gate 19 is released when the trigger 22 has been switched and remains switched for the duration of the forward sweep of the vertical deflection.

The pre-encoder 24 converts the video information of one image line into three processor words. The position of the intersections of the digital patterns with the scanning lines are embodied in three words. This arrangement is identical to that of the read system disclosed in applicant's co-pending U.S. Pat. application Ser. No. 225,839 filed Feb. 14, 1972 and will not be described in detail in the present application. At the end of each image linea an intervention takes place in the processor program and the information is transferred. The position of the image-line counter indicates the address where the information will be stored in the processor memory 13. The scanning terminates when no information is found over a distance of more than 3 mms (24 image lines).

In order to provide an rough impression of the capacity of an arrangement in accordance with the invention, it will be ascertained hereinafter which steps of the procedure are successively carried out and what time they approximately require. Since the addresses on the various postal items may be found at different places on the address side and since the various lines may be printed with different spacings, it will be obvious that the time required by the processor for completing a given program may differ for different postal items.

As stated above, the scanning of the television raster for the location of the address takes 20 msec. After this the locating program is completed; the time and the time then required therefor is estimated at 10 msec. Subsequently, the direct-current component in the vertical deflection coil is set. On account of transient effects an additional period of time of 10 msec is reserved therefor. Then either the despatch code or the delivery code is scanned.

The code to be scanned comprises maximally five consecutive digits. It has to be taken into account that the code is printed on the letter with an additional space between the digits. In that case 11 printing positions have to be scanned. Allowing for an interspace of 0.1 inch between the printing positions, a maximum distance of 1.1 inch = 28 mms has to be covered by the horizontal scan. This takes 12 msec at the assumed transport rate of 2.3 ms/sec.

If it is assumed that the various steps of the procedure need not overlap each other, about 190 msec are left for the recognition step. It is assumed herein that the processing capacity of the machine amounts to 15,000 items per hour, which comes down to a cycle time of 240 msec per letter.

III. Code Position Locator Program

With reference to FIGS. 6 and 7, the following is a detailed example of a program for the determination of the coordinates prior to the start of the scanning in the recognition procedure.

FIG. 6 shows a postal item in the position in which it is scanned (stamp in the left-hand bottom corner). The data as regards name, address and residence are given on the printed lines $r_5$ to $r_2$. The printed line $r_1$ contains the data as regards the sender.

In the position of the postal item L shown the despatch code is printed at the four printing positions on the left-hand side of the line $r_2$, while the delivery code is provided at the five printing positions on the left-hand side of the line $r_3$.

In actual practice it may occur that the data as regards name, address and residence are printed in an oblique position. An example thereof is shown in FIG. 6.

During the locating prodecure the address surface is coarsely scanned in a plurality of horizontal image lines, thereby providing the coordinates of the points of intersection of the image line and the beginning of a printed line. FIG. 7 shows of which points coordinates are provided during the scanning of a postal item as shown in FIG. 6. The points appearing in consecutive image lines are interconneted by a line.

As stated above, during the coarse scanning of a postal item in accorance with the principle illustrated in FIG. 2, a sequence of numbers is produced, which pairwise constitute the coordinates of the points indicated in FIG. 7.

In FIG. 7, $l_1$ to $l_n$ constitute the image lines. The associated horizontal coordinates are indicated by $h_{(index)}$, in wich the index is equal to the ordinal number of the image line. The points are chosen at random without any relationship to FIG. 6.

During scanning the following list is formed in the processor:

| Ordinal number image line | Associated horizontal coordinate |
|---|---|
| $l_1$ | $h_1$ |
| $l_2$ | $h_2$ |
| $l_3$ | $h_3$ |
| $l_7$ | $h_7$ |
| $l_8$ | $h_8$ |
| $l_9$ | $h_9$ |
| etc. | |

It will be apparent from FIG. 7 that these coordinates relate to the regions $a$, $b$, etc. by means of which the location of the code to be recognized has to be determined.

For the recognition procedure it is necessary to derive the coordinates of the starting point for the location of the despatch code or the delivery code from the available information. For this purpose first an analysis is carried out for the initial coordinates of the lines $r_1$ to $r_5$ on the address side of the postal item (see program diagram I).

Subsequently, the number of lines together with the associated initial coordinates (see program diagram II) is determined. The number of lines $r_p$ may be two, three, or more than three. If the number of lines is two, the despatch code and the delivery code are on the same line. If the number of lines is three, the despatch code and the deivery code are likely to be found on separate lines.

If $r_p = 2$, the initial coordinates can be determined by the initial coordinates of line $r_1$.

If $r_p = 3$, first the interspace between the lines is determined. In the case of approximately equal interspaces the starting coordinates are equal to the initial coordinates of the line $r_1$.

Since the postal item is in the upside-down position, it is assumed that in both cases the uppermost line contains the despatch code. However, if there is a comparatively large interspace between the lines $r_1$ and $r_2$ and, moreover, the horizontal coordinate of line $r_1$ is considerably larger (more to the right) than that of line $r_2$ (as indicated in FIG. 6), it is practically certain that the line $r_1$ does not contain an address code so that the starting coordinates for the locating procedure are equal to the initial coordinates of the line $r_2$.

If $r_p > 3$, again the interspace between the lines is ascertained first. Then the initial coordinates of the first line after the interspace, consequently, the line $r_2$ just like in the preceding case, are starting coordinates for the locating procedure of the despatch code.

The analysis for the initial coordinates of the lines will be described hereinafter with reference to FIG. 7 and to the program diagram I.

In the table of the horizontal coordinates the lowest value ($h_m$) is found, which corresponds to the left-most point of intersection of an image line with a printed line. The associated image line is indicated by $l_m$.

In the processor a register $r_u$ (shown in Program Diagram I) is used for storing the initial position for each printed line.

Subsequently it is ascertained in the vertical direction on either side of the image line $l_m$ whether the associated value of the horizontal coordinate $h$ increases (goes more to the right). In this event the next-following image line is observed. In the example given in FIG. 7 the indicated value $h_{14}$ on the image line $l_{14}$ is found for $h_m$ (the left-most value on line $r_3$).

The register $r_u$ (see Program Diagram I) comprises a plurality of sections. The ordinal number of each section is indicated by the index $u$, which has the value −1 at the first storing step.

In a working register indicated by LINE (see diagram I) the ordinal number of the image line ($l_{14}$) is temporarily stored. It is subsequently ascertained whether the image line (LINE − 1) is present in the list. If this is the case and the associated horizontal coordinate is equal or larger, the next-following image line is observed. In the example illustrated in FIG. 7 this procedure is continued until the image line ($l_b$) ($l_{11}$) is reached, i.e., the minimum between lines $r_2$ and $r_3$ in order to determine which $h$ scan belongs to which written line $r$, because the lines may be askew to the direction of travel of the letter L (see FIG. 6). This value is temporarily stored by transferring the contents of the working register LINE to the register $l_b$. The contents of $l_b$ indicate the upper boundary of the printed line.

PROGRAM DIAGRAM I
ANALYSIS OF INITIAL COORDINATES OF THE LINES
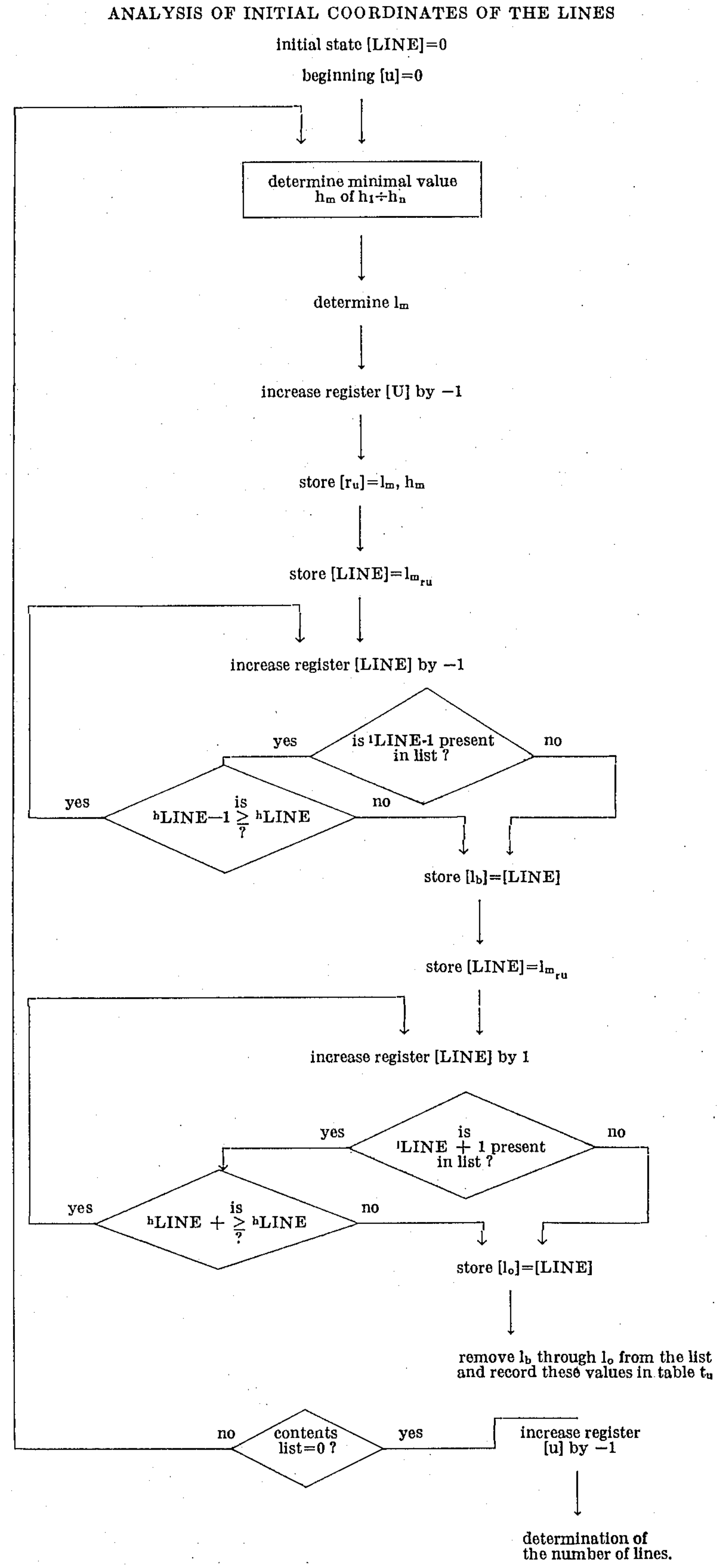
In this case the term "upper" is used in a relative sense, since during the scan the printed line is in upside-down position.
Subsequently, the other side is examined, i.e., the image lines lying on a lower level than the image line $l_m$. For this purposes the value $l_m$ is transferred from the register $r_u$ to the working register LINE. The next-following image line is examined by increasing the contents of the register LINE by 1. This procedure is continued until the requirement that the horizontal coordinate remains equal or becomes larger is no longer fulfilled or until the next-following image line is no longer present in the list. The contents of the working register are then transferred to the register $l_o$. The contents of the latter indicate the lower boundary of the respective printed line. In order to be able to analyze other printed lines, if any, all values between $l_b$ and $l_o$ are removed from the list and transferred to a table $t_u$ (see Program Diagrams I and II). It is then ascertained whether the list still contains data. In the positive case the procedure described is repeated for the then leftmost printed line.

When the list is completely finished, the number of lines of the address is determined. At the same time the correct initial coordinates for scanning are ascertained in the next program section.

Determination of the number of printed lines and initial coordinates.

In program section or diagram I the left-most point of each line was determined and the coordinates thereof were stored as extreme values in a register on an index u (see Program Diagram II).

In program section or diagram II for determining the number of lines, the initial value of the index is $u - 1$.

The initial value of a further index $p$ is assumed to be equal to 0. After this program section has been finished, the index $p$ is equal to the number of printed lines found.

At the start of the program section II the indices $p$ and $u$ are increased by the value l.

The coordinates $1_{r_u}$ and $h_{r_u}$ of the extreme value last found are fetched from the register $r_u$. Table $t_u$ contains the coordinates of all next, i.e., associated coordinates.

The horizontal, extreme coordinate $h_{r_u}$ is temporarily stored. The associated ordinal number $1_{r_u}$ is stored in the register LINE. The register LINE is increased by the value $-1$, which means that the image lying above the image line having the extreme value is considered. The purpose is to search the environment of the extreme value found, so that the most suitable initial coordinates for the scanning of the printed line can be determined. These are the coordinates of the "centre" of the printed line in question.

To this end the horizontal coordinate of the next-following image line is compared with the horizontal coordinate ($h_r$). When the difference exceeds a given number of units, e.g. 10, the ordinal number of the image line stored in the register LINE is transferred to a register $B_r$ (see Diagram II). The value $B_r$ then forms the upper boundary of the printed line at that place.

Subsequently, also the image lines on the other side of the extreme value $1_{r_u}$ are considered.

To this end the contents of register LINE are rendered equal to $1_{r_u}$, to which the value 1 is added. As soon as a difference between the horizontal coordinates of 10 or more units appears, the ordinal number of the image line in question is stored in the register $O_r$ (see Diagram II).

The value $O_r$ constitutes the lower boundary of the printed line at that place.

With a scanning density of one image line per millimeter on the address surface the difference between $B_r$ and $O_r$ should be at least two.

Thereafter the "centre" of the printed line is determined. Thereto applies that $V = B_r + O_r/2$. This is also the vertical coordinate $l$, at which the scanning of this printed line has to start. This (vertical) coordinate $l$ is stored in a register $V_{rp}$ (see Program Diagram II). The horizontal coordinate $h$, at which the scanning should start, is present in register $H_r$ and this value is stored in register $H_{rp}$.

It is then checked whether further extreme values have been found. This is the case as long as the index $u$ is not yet zero. In that case the program section II is repeated. The program section II is completed as many times as the number of extreme values found.

In FIG. 7 it is indicated by means of the shaded regions $a$, $b$, $c$ which parts are examined in the environment of an extreme value found (such as $h_{14}$). It appears that in this way a satisfactory segmentation of the printed lines is obtained.

After this program section II has been completed, index $p$ is equal to the number of printed lines, while also the initial coordinates for scanning each printed line are fixed.

Determination of starting coordinates for the scanning (see diagram III)

The resultant vertical coordinates l, viz. $\overline{V}_{r_1}$ to $V_{r_p}$, which indicate the level of the "centre" of the printed lines, are arranged in the order of succession of the values of the horizontal coordinates $h$. Now first the vertical coordinates $l$ are arranged in the order of succession of the values of these vertical coordinates themselves, consequently, in the order of succession of the printed lines. Then the index $p$ is fetched, which has been determined during the preceding program section II. The value thereof is equal to the number of printed lines. To this value is added $-2$. If the rest is zero, two printed lines are present. In this case the starting coordinates for scanning are: vertical starting coordinate $S_V = V_{r1}$, horizontal starting coordinate $S_H = H_{r1}$ and the vertical coordinate $l$ and the horizontal coordinate $h$ of the left-hand end of line 1, respectively.

If the rest is not zero, the number of printed lines exceeds two.

In order to ascertain whether there are three printed lines the number $-1$ is added to the rest. If the rest is zero, this is the case. It is then ascertained which printed lines are associated with one another. To this end the distance $A_1$ between lines $r_1$ and $r_2$ (see FIG. 7), as well as the distance $A_2$ between lines 2 and 3 are determined. If the difference between the distances $A_1$ and $A_2$ is smaller than or equal to, for example, three units, the three printed lines are associated with the address. In this case also the coordinates of line 1 ($\overline{V}_{r_1}$, $\overline{H}_{r_1}$) are chosen as starting coordinates for the scanning procedure.

If the difference between the distances $A_1$ and $A_2$ is more than 3 units, it is ascertained whether the lines 2 and 3 form the addresss. The condition is then that the distance $A_1$ should be 10 or more units larger than the distance $A_2$. It is furthermore assumed that the horizontal coordinate of line 1 ($H_{r_1}$) should exceed the horizontal coordinate $\overline{H}_{r_2}$ of line 2 by at least 30 units (mms) (as shown in FIG. 6).

In this case the starting coordinates become equal to the coordinates of the left-hand end of line $r_2$.

If the difference between the horizontal coordinates of lines 1 and 2 does not satisfy the above condition, the arrangement of the address is considered invalid and no starting coordinates are determined.

PROGRAM DIAGRAM II
DETERMINATION OF NUMBER OF LINES AND INITIAL COORDINATES
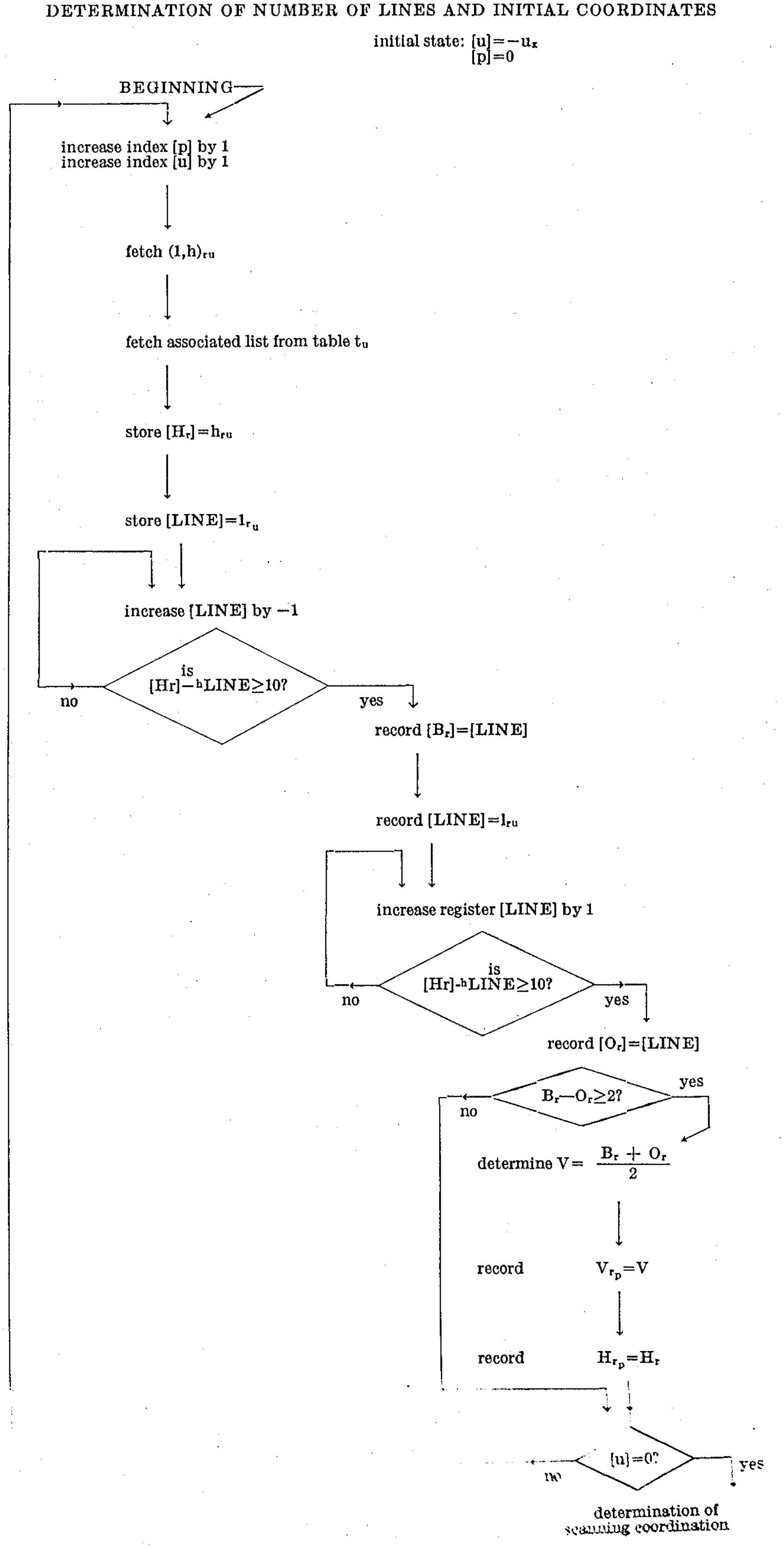

PROGRAM DIAGRAM III

DETERMINATION OF STARTING COORDINATES FOR THE SCANNING

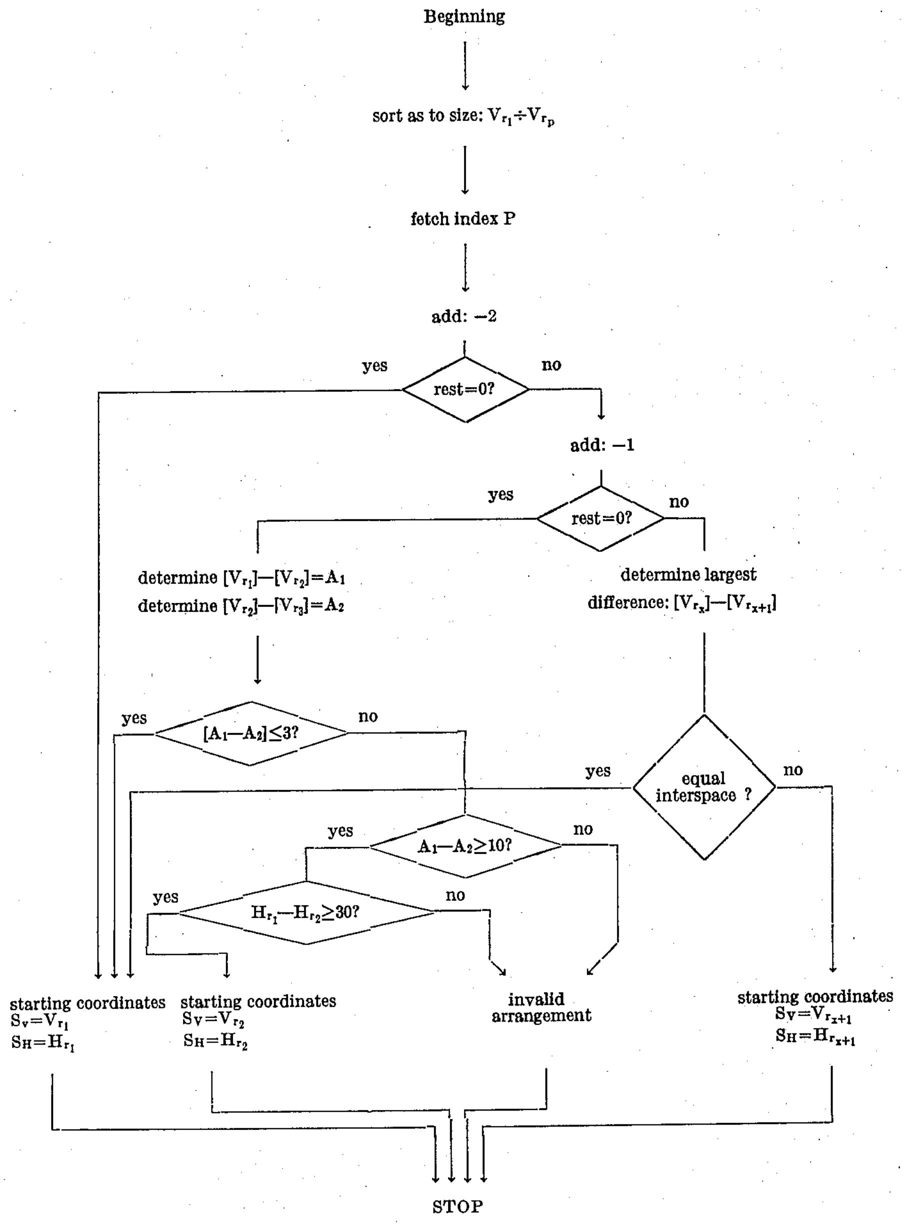

When the address comprises more than three printed lines, it may be assumed that the first line of the address begins after a large vertical spacing.

To this end the largest difference between the consecutive lines $(|V_{r_x}|-|V_{r_{x+1}}|)$ is determined.

Then the starting coordinates for the scanning procedure are the coordinates of the left-hand end of the line $V_{r_{x+1}}$. If the interspaces between the printed lines are equal, the starting coordinates of line 1 are chosen to be $(V_{r_1}, H_{r_1})$.

While there is described above the principles of this invention in connection with specific apparatus, it is to be clearly understood that this description is made only by way of example and not as a limitation to the scope of this invention.

I claim:

1. An apparatus for locating and recognizing a coded address on documents comprising:
   a. a video camera having a coarse raster scanning means for viewing said documents,
   b. an image dissector tube having a fine raster scanning means for viewing said documents, said tube being spaced from said camera along a path for said documents,
   c. means for moving said documents successively passed said camera and said tube at a constant continuous rate,
   d. means connected to said camera for determing the location of the coded address on said documents, comprising a pulse sequence discriminator means for determining the presence of the coded address, and separate counter means for determining the horizontal and vertical distances of said address from the edges of said documents, and e. means for controlling said tube for scanning only the location determined by said location determining means for only viewing said address by said tube for reading the code of said addresss, comprising a digital to analogue convertor means for producing a direct current for vertically positioning the location of said address to be scanned by said tube in accordance with one of said separate counter means, and a sawtooth wave generator for horizontally positioning the location of said address in accordance with the other of said separate counter means.

2. An apparatus according to claim 1 including means located along said path of said documents between said image dissector tube and said video camera for determining the leading edges of said documents for controlling said image dissector tube.

3. An apparatus according to claim 1 wherein said means for determining the location of said address comprises a circuit for producing a pulsed signal corresponding to the number and vertical spacing of and between the lines of said address.

4. An apparatus according to claim 1 wherein the spacing between said image dissector tube and said video camera is determined by the speed of said means for moving said document and the time required for determining said location of said address code on said document.

5. An apparatus according to claim 1 wherein both said location determining means and said controlling means comprise circuits including counters and AND-gates and clock generators.

6. An apparatus according to claim 1 wherein said location determining means includes a register for pulses generated in said counter means.

7. An apparatus according to claim 1 wherein said means for controlling said image dissector tube comprises a clock generator for controlling said sawtooth wave generator for controlling the scanning of said tube.

8. An apparatus according to claim 1 wherein said controlling means for said image dissector tube includes a circuit comprising dividers and limiters.

9. An apparatus according to claim 1 including a clock generator for controlling said horizontal counter means and wherein said vertical counter means counts the raster lines employed by said camera.

* * * * *

0-1050
5/69)

UNITED STATES PATENT OFFICE
CERTIFICATE OF CORRECTION

Patent No. 3,846,753 Dated November 5, 1974

Inventor(s) Arie Adriaan SPANJERSBERG

It is certified that error appears in the above-identified patent and that said Letters Patent are hereby corrected as shown below:

Cancel the ABSTRACT and insert in place thereof the first full paragraph on Column 1, lines 3 through 20 namely - - An automatic address detection arrangement for the automatic location and subsequent recognition of an address code on documents, which arrangement comprises a scanning circuit arrangement by means of which in a first course-raster scanning operation the information on the address side of the document is scanned and the address code is located among this information, and in a second fine-raster scanning operation the address code is scanned, the scanning circuit arrangement comprising scanning means for converting the information into a pulsed signal, a processor for locating the address code by means of this signal and for controlling the scanning means so as to permit scanning of the individual characters of the code in the proper location and for temporarily storing the resultant information in a section of the processor memory, and a document leading edge detector for producing a scan start signal. - - Column 1, lines 3 through 20 cancel these lines entirely. Column 2, line 68 cancel "written". Column 3, line 1 cancel "words of the"; before "name" insert - - written words of the - - . Column 5, line 30 change "lines" to - - line - - . Column 7, line 38, change "curren" to - - current - -. Column 8, line 33, change "linea" to - - line - -; line 53 cancel "the time"; Column 10, line 7 change "deivery" to - - delivery - -. Column 13, line 30, change "0" to - - "O" - -; line 59 change "1" to - - "1" - -.

Signed and sealed this 11th day of February 1975.

(SEAL)
Attest:

RUTH C. MASON
Attesting Officer

C. MARSHALL DANN
Commissioner of Patents
and Trademarks

UNITED STATES PATENT OFFICE

CERTIFICATE OF CORRECTION

PATENT NO. : 3,846,753

DATED : November 5, 1974

INVENTOR(S) : Arie Adriaan SPANJERSBERG

It is certified that error appears in the above-identified patent and that said Letters Patent are hereby corrected as shown below:

change Assignee item [73] on Title page to read - - De Staat Der Nederlanden, Ten Deze Vertegenwoordigd Door De Directeur - Generaal Der Posterijen, Telegrafie En Telefonie

Signed and Sealed this

*twenty-second* Day of *July 1975*

[SEAL]

*Attest:*

RUTH C. MASON
*Attesting Officer*

C. MARSHALL DANN
*Commissioner of Patents and Trademarks*